United States Patent
Ferniani et al.

(10) Patent No.: US 9,282,787 B2
(45) Date of Patent: Mar. 15, 2016

(54) MOLDED FOOTWEAR WITH WOVEN APPEARANCE AND VENTILATION FEATURES

(75) Inventors: Stefano Ferniani, Padua (IT); Federico Fongher, Padua (IT); Dale Bathum, Boulder, CO (US)

(73) Assignee: CROCS, INC., Niwot, CO (US)

( * ) Notice: Subject to any disclaimer, the term of this patent is extended or adjusted under 35 U.S.C. 154(b) by 717 days.

(21) Appl. No.: 13/492,682

(22) Filed: Jun. 8, 2012

(65) Prior Publication Data

US 2013/0139329 A1 Jun. 6, 2013

Related U.S. Application Data

(60) Provisional application No. 61/495,859, filed on Jun. 10, 2011.

(51) Int. Cl.
| | | |
|---|---|---|
| *A43B 1/00* | (2006.01) | |
| *A43D 8/00* | (2006.01) | |
| *A43B 7/08* | (2006.01) | |
| *A43B 23/02* | (2006.01) | |
| *B29D 35/14* | (2010.01) | |

(52) U.S. Cl.
CPC ... *A43D 8/00* (2013.01); *A43B 7/08* (2013.01); *A43B 7/085* (2013.01); *A43B 23/0215* (2013.01); *A43B 23/0235* (2013.01); *B29D 35/146* (2013.01)

(58) Field of Classification Search
CPC ....... A43D 8/00; A43D 8/48; A43B 23/0215; A43B 7/085; B29C 69/005; B29C 69/001
See application file for complete search history.

(56) References Cited

U.S. PATENT DOCUMENTS

| | | | |
|---|---|---|---|
| 2,118,255 A | 5/1938 | Loucks et al. | |
| 3,139,127 A | 6/1964 | Urschel et al. | |
| 4,282,277 A * | 8/1981 | Austen et al. | 428/36.4 |
| 6,277,464 B1 * | 8/2001 | Ronan et al. | 428/131 |
| 7,047,668 B2 | 5/2006 | Burris et al. | |
| 7,913,420 B2 | 3/2011 | Arizumi | |
| 2002/0029094 A1 | 3/2002 | Koreishi | |

(Continued)

FOREIGN PATENT DOCUMENTS

| | | |
|---|---|---|
| CN | 1205269 A | 1/2009 |
| JP | 6000826 A | 1/1994 |

(Continued)

OTHER PUBLICATIONS

PCT/US12/41721, filed Jun. 8, 2012, International Search Report and Written Opinion dated Oct. 4, 2012, 10 pages.

(Continued)

*Primary Examiner* — Galen Hauth

(74) *Attorney, Agent, or Firm* — Wilmer Cutler Pickering Hale and Dorr LLP

(57) ABSTRACT

According to embodiments of the invention, a precursor sheet is formed by injecting an EVA-based material into a mold cavity. The mold cavity is configured to create a series of indentations through a first portion of the precursor sheet and into a second portion of the precursor sheet. The precursor sheet is removed from the mold cavity and the second portion of the precursor sheet is removed from the first portion of the precursor sheet to create an isolated sheet with a series of through-holes. The isolated sheet is then formed into a portion of a shoe.

12 Claims, 10 Drawing Sheets

(56) References Cited

U.S. PATENT DOCUMENTS

2004/0231190 A1* 11/2004 Seamans ................ 36/11.5
2008/0050575 A1* 2/2008 Park ................... 428/304.4

FOREIGN PATENT DOCUMENTS

| JP | 2000104100 A | 4/2000 |
| JP | 2004217744 A | 8/2004 |
| WO | WO-0036943 A1 | 6/2000 |

OTHER PUBLICATIONS

Office Action and Search Report issued in Chinese counterpart application, Application No. 201280028578.7, issued Nov. 25, 2015 (7 pages).

* cited by examiner

MOLDED FOOTWEAR WITH WOVEN APPEARANCE AND VENTILATION FEATURES

RELATED APPLICATIONS

This application claims priority to U.S. Provisional Application No. 61/495,859, filed Jun. 10, 2011, and entitled "Molded Footwear with Woven Appearance and Ventilation Features," the contents of which are incorporated herein by reference for all purposes.

TECHNICAL FIELD

Embodiments of the invention relate to footwear in general and in particular to footwear with improved ventilation.

BACKGROUND

Due to the expansive nature of EVA material during the molding process, current EVA products do not include relatively thin layers of EVA material having a texture formed thereon and/or having small holes molded therein. Attempting to mold small holes into an EVA sheet is either impractical because it involves the use of easily-breakable mold core pieces, or is difficult because any small holes formed in such a thin EVA sheet are quickly closed off by the expansion of the foam around the hole perimeter.

SUMMARY

According to embodiments of the invention, a sheet is formed by injecting a material into a mold cavity. The mold cavity is configured to create a series of indentations through a first portion of the sheet and into a second portion of the sheet. The sheet is removed from the mold cavity and the first portion of the sheet is isolated from the second portion of the sheet to create an isolated sheet with a series of through-holes. The isolated portion of the sheet is then formed into a portion of a shoe.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
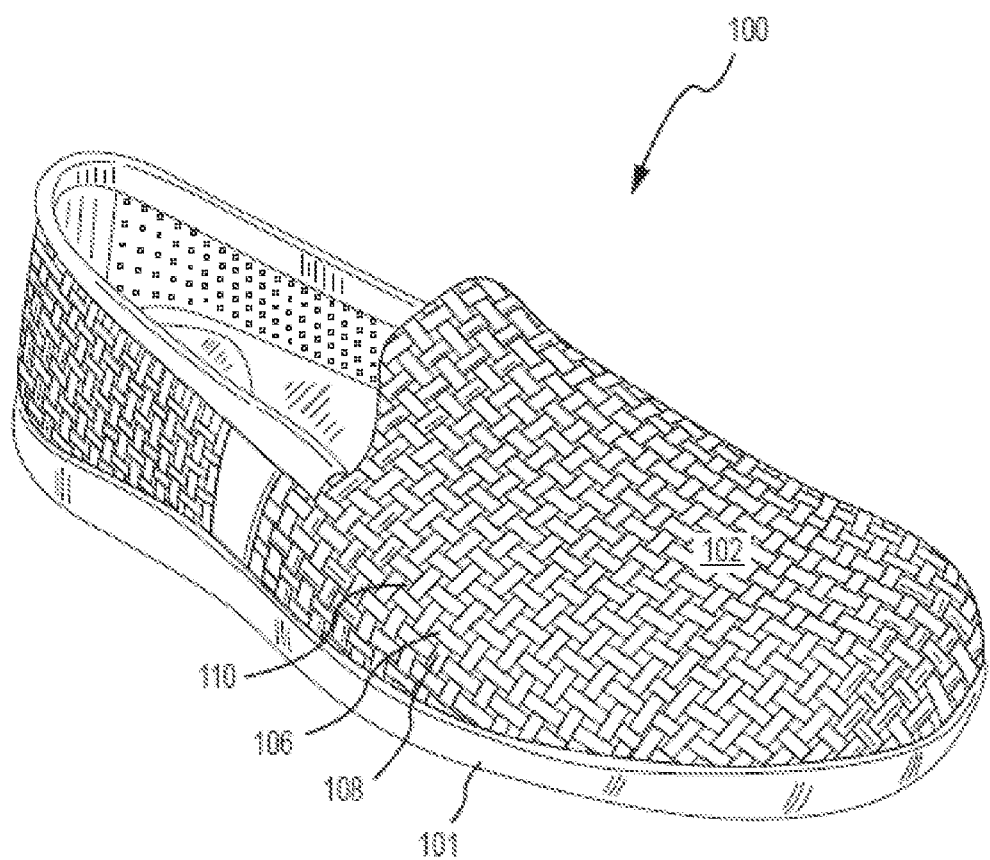
FIG. 1 illustrates a perspective view of a shoe according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to several embodiments of the invention, a shoe is formed of a molded material that incorporates a three-dimensional woven texture. The molded material may be an EVA-based material that is injected into a mold. The mold comprises at least one plate with a negative of the three-dimensional woven texture. Once the mold has set the three-dimensional woven texture into the material, the material is cut and formed into a portion of the shoe.

As shown in FIG. 1, a shoe 100 may include a sole 101 and an upper 102. The upper 102 may be formed with a particular texture that includes a plurality of warp segments 106 and a plurality of weft segments 108. The material of the upper 102 may also include a plurality of holes 110. Each hole 110 may be circumscribed by a pair of warp segment 106 and a pair of weft segments 108. In that manner, the upper 102 may incorporate a three dimensional woven texture. In other embodiments, the upper 102 is formed with a particular texture that includes a plurality of holes 110 without specifically incorporating a plurality of warp segments 106 or weft segments 108.

In some embodiments, the length of each warp segment 106 and/or weft segment 108 may be 4 mm or 5 mm. For example, the warp segments 106 may be 4 mm long while the weft segments may be 5 mm long. The thickness of the warp segments 106 and/or weft segments 108 may be approximately 2 mm or 3 mm. Because the holes 110 are circumscribed by the warp segments 106 and weft segments 108, the depth of each hole 110 will match the thickness of the warp segments 106 and weft segments 108 surrounding the hole 110. In some embodiments, the holes 110 are circular with a diameter of 0.8 mm. In other embodiments, the holes 110 are square with a length of 0.8 mm. In yet other embodiments, the diameter or length of the holes 110 is approximately 1.2 mm, and the thickness of the warp segments 106 and weft segments 108 may be from 2.5 to 3 mm.

Figure 2:
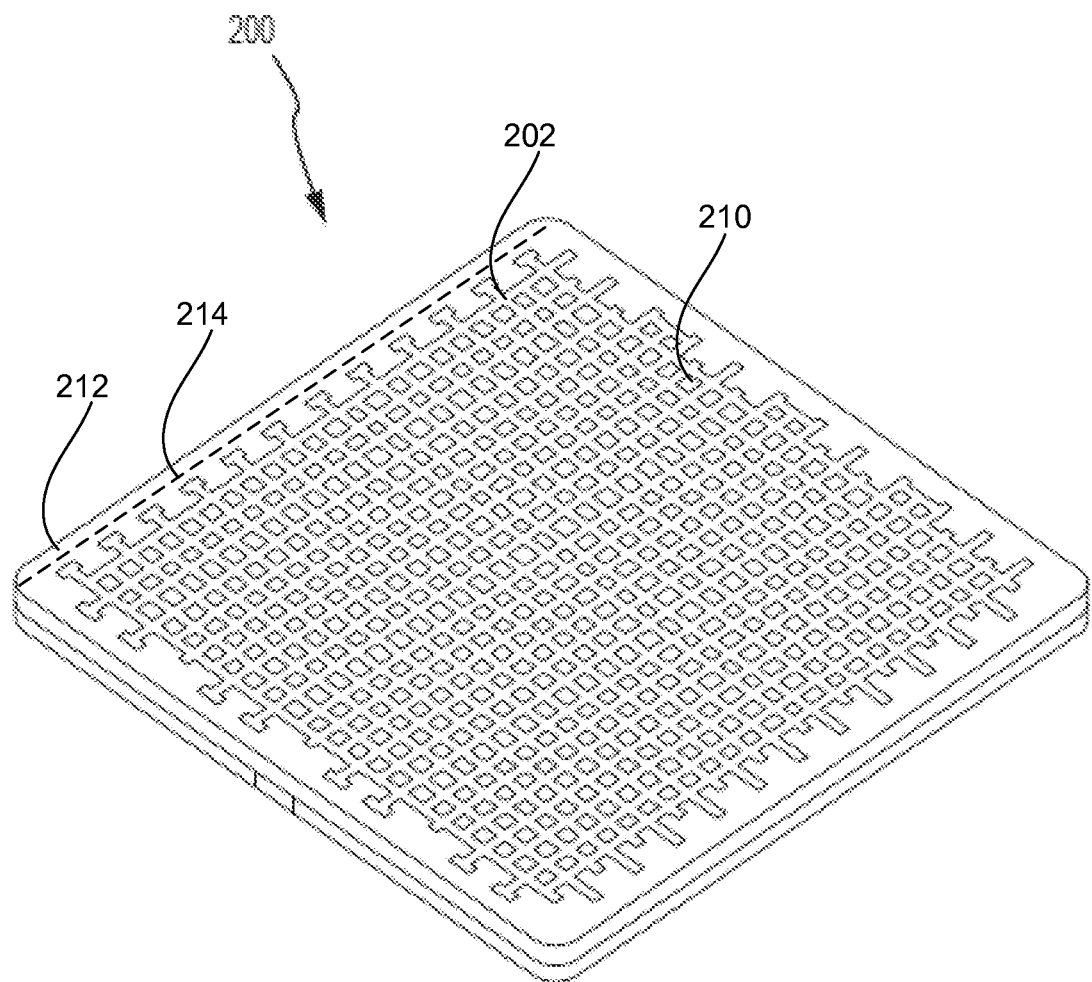
FIG. 2 illustrates a perspective view of a molded sheet according to embodiments of the present invention.

FIG. 2 depicts embodiments including a precursor sheet 200 (sometime referred to simply as "sheet" 200) of material whose first surface 202 incorporates a series of indentations 210, among other design features. In some embodiments, the length of the sheet 200 is 215 mm, the height is 130 mm, and the thickness is 5 mm. Because the series of indentations 210 does not extend to the edges of the sheet 200 (e.g., edge 212 in FIG. 2), the sheet 200 may be cut or trimmed along line 214 in the first surface 202. In some embodiments the line 214 is located outside the section of the sheet 200 in which the indentations are found.

Figure 3:
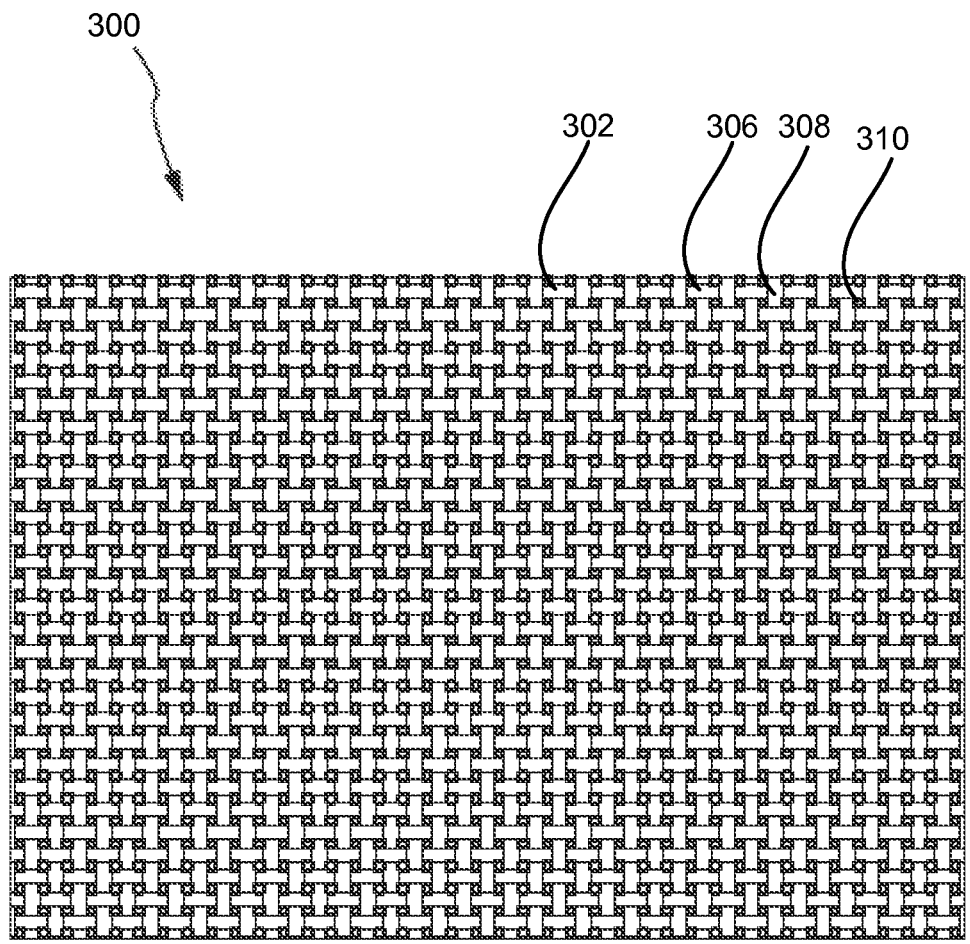
FIG. 3 illustrates a front view of a trimmed molded sheet according to embodiments of the present invention.
Figure 4:
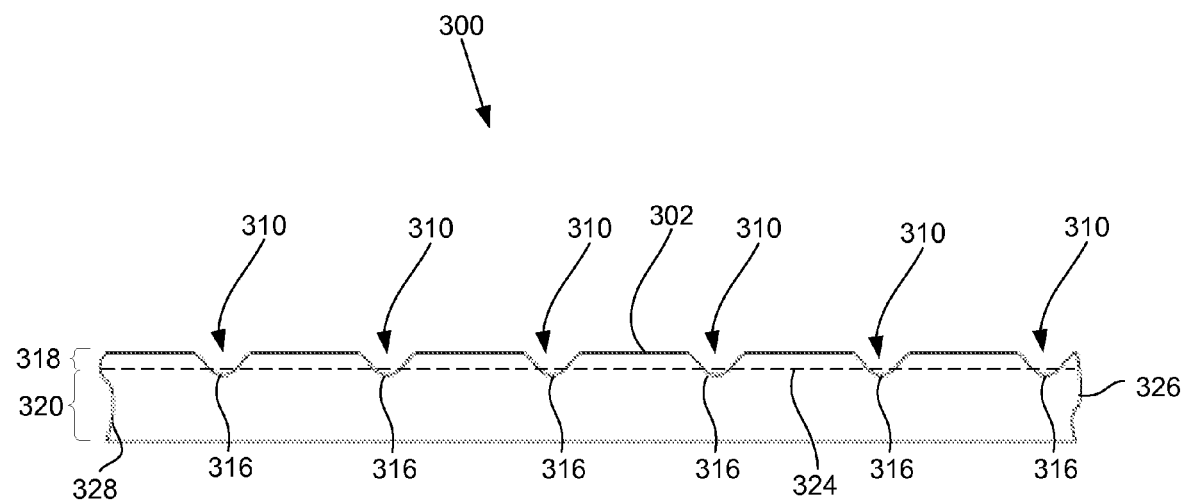
FIG. 4 illustrates a cut-away side view of a molded sheet according to embodiments of the present invention.

FIGS. 3 and 4 illustrates a sheet 300 in which the excess material (i.e., the exterior sections of the sheet in which the indentations or woven pattern are not found) has been trimmed or removed. In particular, the sheet 300 includes multiple warp segments 306, weft segments 308, and indentations 310. In some embodiments, the indentations 310 are approximately 2 mm deep and thus do not completely pierce the sheet 300. In other words, those indentations 310 extend through a first surface 302 of the sheet 300 and through a first portion 318 of the sheet without extending through a second portion 320 of the sheet 300. Because the indentations 310 do not extend through the second portion 320 of the sheet 300, the indentations 310 include closed ends 316 in the second portion 320 of the sheet 300.

In those embodiments, the first portion 318 of the sheet 300 containing the woven texture or indentations is isolated, e.g., cut, to form an isolated section or cut sheet. In some embodiments, the thickness of the isolated section may be approximately 1.8 mm. While the thickness of the cut sheet may vary, the thickness should be less than the depth of the indentations 310 to create holes that are be open on both sides of the cut sheet. For example, with respect to FIG. 4, the second portion 320 is at least partially cut away from the first portion 318 by cutting along a plane 324 that does not intersect the first surface 302 of the sheet. In that manner, closed ends 316 of the indentations 310 will be cut away from the first portion 318 and from the remaining portions of the indentations 310. Cutting along the plane 324 may include cutting through other surfaces of the sheet, such as sides 326, 328. Other cutting actions may be incorporated with cutting along the plane 324, such as trimming portions of the sheet without the woven texture.

Figure 5:
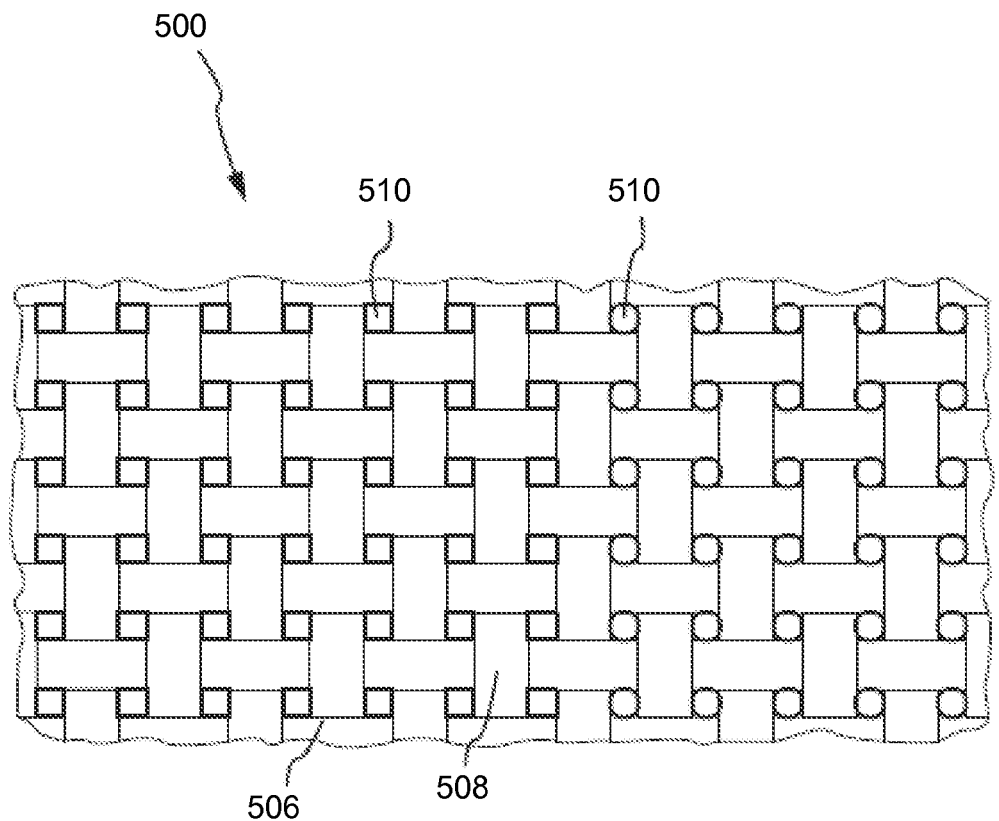
FIG. 5 illustrates a closer front view of a molded sheet with square indentations and round indentations, according to embodiments of the present invention.

As shown in FIG. 5, the indentations or holes 510 may be circular or square. They may be formed by a particular three-dimensional texture, such as the warps 506 and wefts 508 shown in FIG. 5, or they may be formed without additional texture or design.

In some embodiments, the sheet 200 is formed of an EVA-based material that is injected into a mold cavity. The mold cavity includes a negative of the woven pattern with a set of blind holes. In some embodiments, the EVA-based material has an expansion coefficient of approximately equal to or lower than 1.70. After the EVA-based material has set, the section of the sheet 200 incorporating the woven texture is isolated from the sheet. The isolated section is heated and then compressed about a last as part of a compressed molding process. In some embodiments, a plurality of lasts are used to mold isolated sections into the various components of the upper 102, which may be joined by, e.g., strobel stitching. In other embodiments, the shoe is formed of a one-piece molded construction that includes a section incorporating the woven texture.

Making a sheet of EVA-based material similar to those shown in the figures (i.e., a sheet having a three-dimensional texture and/or small holes, for example small holes which are evenly spaced and/or formed in a pattern) is thus possible by, for example, forming the desired texture and/or indentations on one or both sides of a sheet of EVA-based material and then cutting the sheet of EVA-based material across the indentations to form a thinner textured layer, while discarding the middle or bottom layer. The indentations in the initial EVA-based sheet may not pass all the way through the sheet due to the expansive nature of the EVA-based material. However, shaving or cutting off the top layer which has texture and/or indentations after molding and cooling of the EVA-based sheet permits creation of relatively thin sheets of textured EVA-based material with more complex patterns. Attempting to directly mold such textured and/or ventilated sheets initially at their final thickness may result in distorted texture and/or closed holes due to the expansion of the EVA-based materials.

Figure 6:
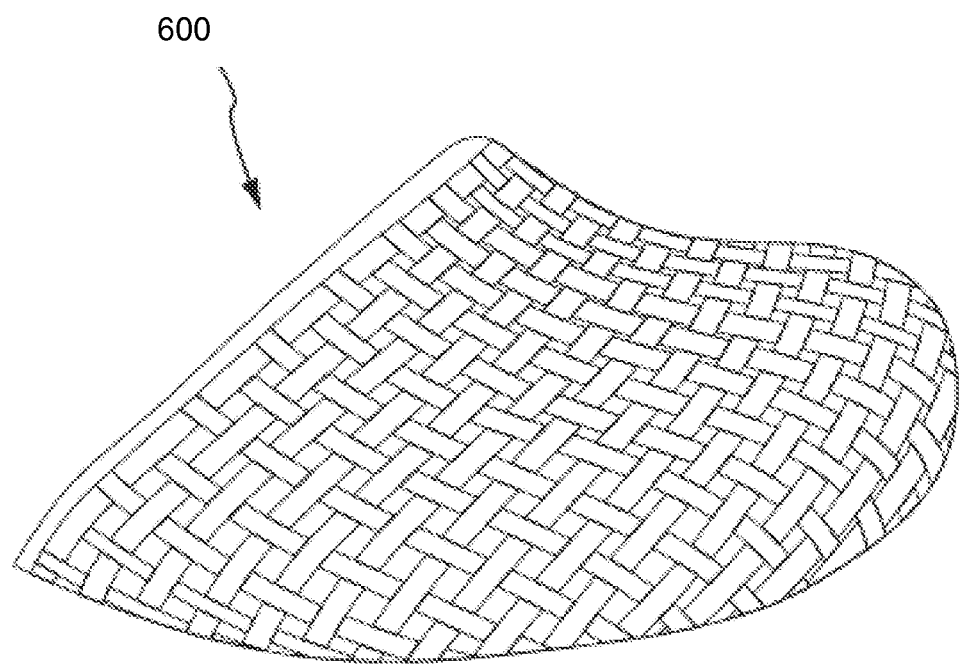
FIG. 6 illustrates a side view of a toe mold made with a molded sheet according to embodiments of the present invention.
Figure 7:
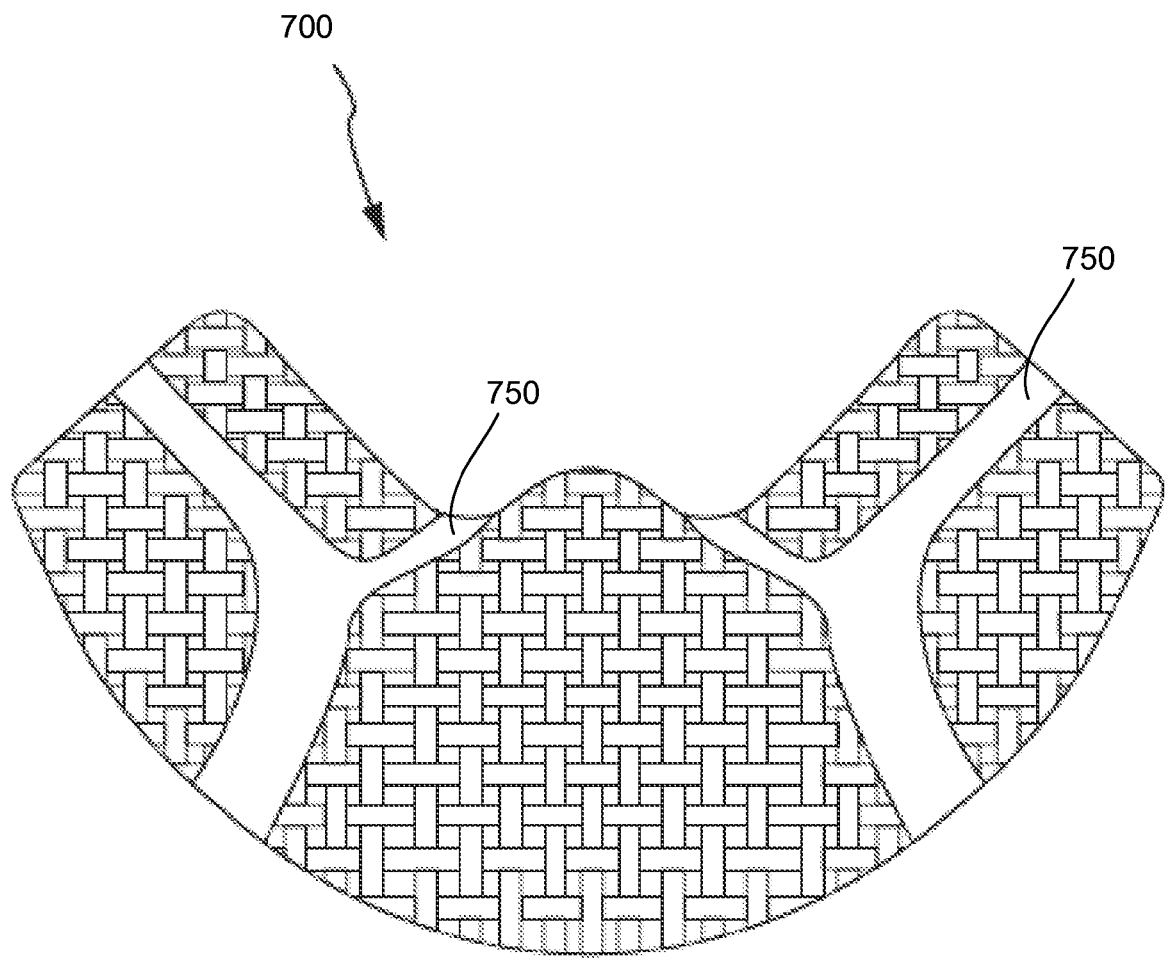
FIG. 7 illustrates a front view of a molded sheet having cutting and/or connection location features molded into the woven texture layer, according to embodiments of the present invention.

An exemplary compressed molded sheet 600 is shown in FIG. 6. The compressed molding process may modify the shape of the sheet 600 permanently. The compressed molding process may be used to mold cutting and/or connection location features (e.g., features 750 in FIG. 7) into the woven texture layer. Various pieces of the shoe 100 may be created in this fashion.

Figure 8:
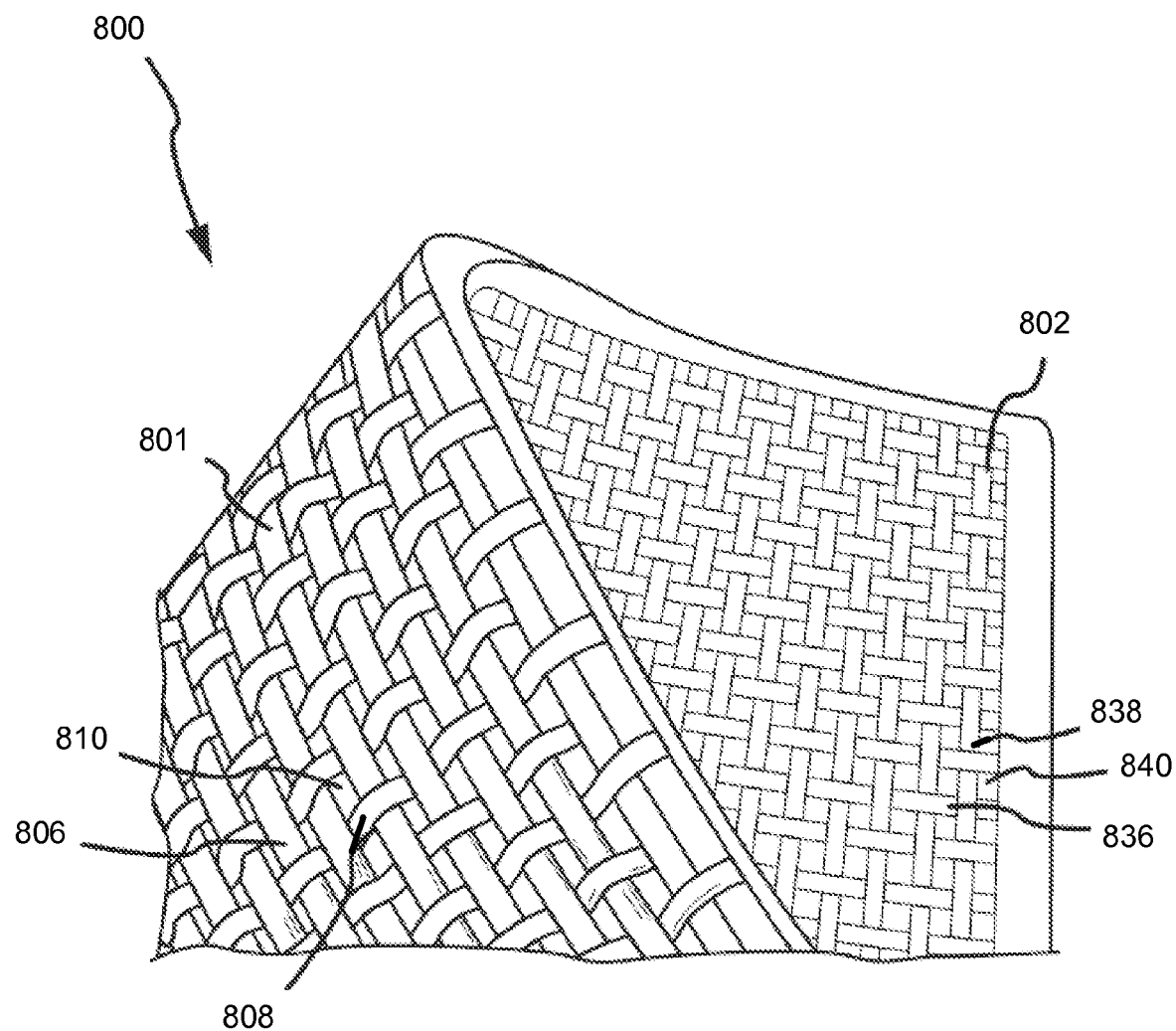
FIG. 8 illustrates a side perspective view of a double-sided molded sheet according to embodiments of the present invention.
Figure 9:
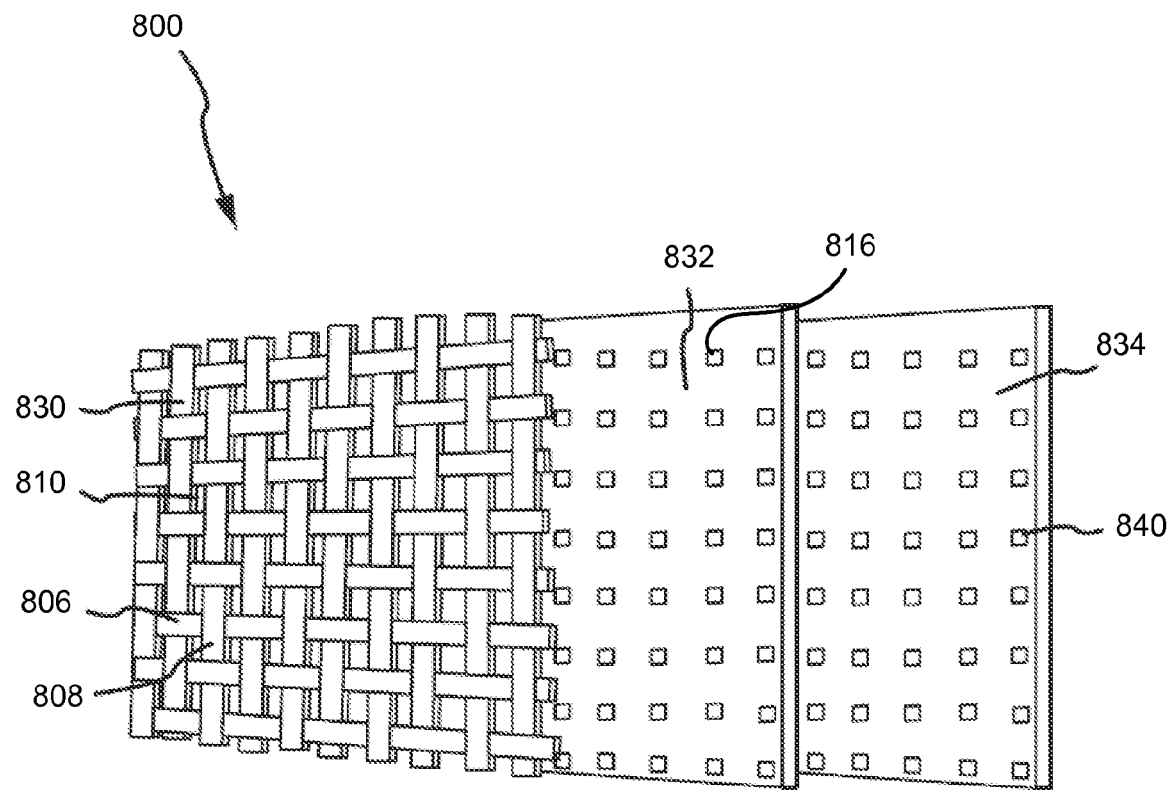
FIG. 9 illustrates a side perspective view of the double-sided sheet of FIG. 8 after slicing of each textured outer layer.
Figure 10:
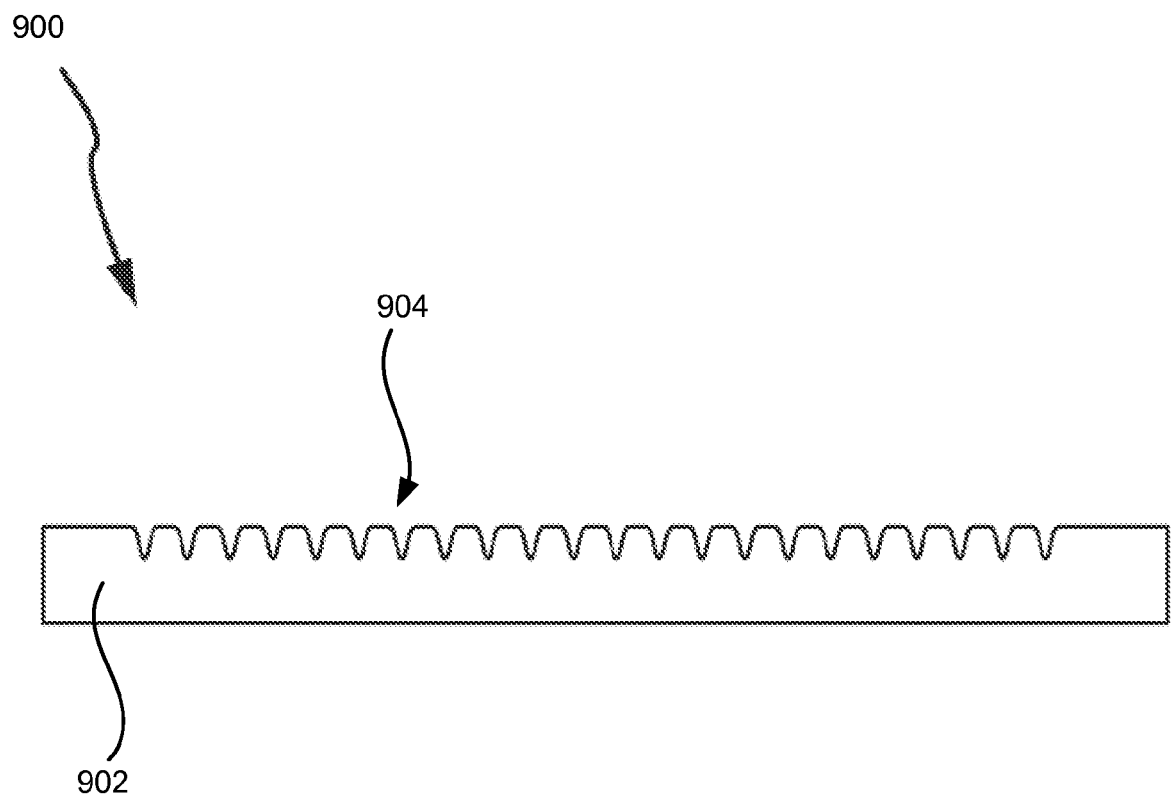
FIG. 10 illustrates a cut away side view of a plate according to embodiments of the invention.

In the embodiments shown in FIGS. 8 and 9, a sheet 800 may contain a woven texture (e.g., warps 806, 836 and wefts 808, 838) and/or a series of indentations (e.g., indentations 810 and 840) on opposite surfaces 801, 802 of the sheet 800. In those embodiments, the sheet 800 is cut into three separate pieces 830, 832, and 834 using the cutting techniques described above. In other words, pieces 830 and 834 are cut so that the indentations 810, 840 create open holes extending through the pieces 830, 834. The remaining piece 832 includes the closed ends 816 that formerly terminated the indentations 810, 840. Pieces 830, 834 are then used to create an upper 102 of a shoe 100. In creating the double-sided sheet 800, a double sided mold may be used.

In embodiments of the invention, the three-dimensional woven texture may portray multiple warp segments and multiple weft segments. The texture is three dimensional in that each of the warp segments and each of the weft segments are three-dimensional, as opposed to designs in which a plurality of warp segments and weft segments are painted or drawn onto a surface. In some embodiments, the warp segments and the weft segments are formed of a single material, such that the wefts and the warps merge at each juncture. In other words, in those embodiments each weft is not a complete strand that wraps over and under a series of complete warps as in a traditional weave. The warp segments and weft segments are molded of a single material, and the indentations or holes may form various shapes.

In a preferred embodiment, the EVA-based material has an expansion coefficient of less than 1.70. If the material is too expansive, the holes may be too large to be aesthetically pleasing, and/or may form a weaker or less durable material layer. A material with an expansion coefficient of 1.43 may be used.

In some embodiments, the mold comprises two plates with the negative of the weave texture so that, after injection, the EVA-based material sheet or template has the three-dimensional woven texture on two sides. Those portions of the sheet having the three-dimensional texture are cut from the sheet. For example those portions are cut at a specific depth so that the weft segments and the warp segments have a particular depth, e.g., 0.8 mm. Ideally, the sheet or template will be thin, for example approximately 11.5 mm to about 3 mm in order to reduce waste.

Once the portions of the template having the three-dimensional texture are separated, the isolated portions can be cut and pressed over a last to form the particular portion or portions of the shoe. Forming the shoe portions may involve a compressed molding process in which the portion of the template is heated and wrapped about a last. Once the template cools, it assumes a permanent shape. Using an injection process prior to the compressed molding process results in a shoe with better mechanical properties. In addition, the three-dimensional woven texture is better retained.

In another embodiment, and referring to FIG. 9, a mold 900 includes a first plate 902 having a series of blind holes 904. In some embodiments, the first plate 902 includes a negative of the three-dimensional woven texture. A similarly-configured second plate may also be used to create a sheet with particular textures (e.g., a series of indentations) on both sides of the sheet.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of making at least a portion of a shoe comprising:
   injecting a material into a mold cavity to create a precursor sheet, wherein the mold cavity is configured to create a three-dimensional texture in a first surface of a first portion of the precursor sheet, the three-dimensional texture extending through the first portion of the precursor sheet;
   removing the precursor sheet from the mold cavity;
   removing a second portion of the precursor sheet from the first portion of the precursor sheet to create a second surface of the first portion of the precursor sheet that is opposite the first surface; and
   forming the first portion of the precursor sheet into at least a portion of a shoe.

2. The method of claim 1, wherein the material is an EVA-based material.

3. The method of claim 2, wherein the mold cavity in which the EVA-based material is injected is configured to create a series of regularly spaced indentations through the first portion of the precursor sheet as at least part of the three-dimensional texture.

4. The method of claim 1, wherein the step of removing the second portion of the precursor sheet from the first portion of the precursor sheet comprises cutting the precursor sheet along a plane that does not intersect the first surface of the first portion of the precursor sheet.

5. The method of claim 4, wherein the step of removing the second portion of the precursor sheet from the first portion of the precursor sheet further comprises cutting the precursor sheet along the plane that does not intersect the first surface of the first portion of the precursor sheet at a surface of the precursor sheet that intersects the first surface.

6. The method of claim 4, wherein the step of removing the second portion of the precursor sheet from the first portion of the precursor sheet further comprises cutting the precursor sheet along a second plane that intersects the first surface along a line located outside of the three-dimensional texture.

7. A method of making at least a portion of a shoe comprising:
   injecting an EVA-based material into a mold cavity to form a precursor sheet, wherein the mold cavity is configured to create a series of indentations extending through a first surface of the precursor sheet and through a first section of the precursor sheet, wherein each indentation in the series of indentations includes a closed end in a second section of the precursor sheet;
   removing the precursor sheet from the mold cavity;
   separating the second section of precursor sheet from the first section of the precursor sheet, including removing the closed end of each indentation from the remaining portions of the indentations, to form an isolated section having a series of through holes; and
   forming the isolated section into at least a first portion of a shoe.

8. The method of claim 7, wherein forming the isolated section into the portion of the shoe comprises the following steps: heating the isolated section and compressing the isolated section about a last.

9. The method of claim 7, wherein the mold cavity in which the EVA-based material is injected is configured to create a series of regularly spaced indentations through the first section of the precursor sheet.

10. The method of claim 7, wherein the EVA-based material has an expansion coefficient approximately equal to or lower than 1.7.

11. The method of claim 7, wherein the mold cavity is further configured to create a second series of indentations through a second surface of the precursor sheet and through a third section of the precursor sheet, wherein each indentation in the second series of indentations includes a closed end in the second section of the precursor sheet.

12. The method of claim 11, wherein the isolated section is an isolated first section, the method further comprising:
   separating the third section of the precursor sheet from the second section of the precursor sheet to form an isolated second section; and
   forming the isolated second section into at least a second portion of the shoe.

* * * * *